United States Patent [19]

Nguyen

[11] Patent Number: 4,505,257
[45] Date of Patent: Mar. 19, 1985

[54] SOLAR COLLECTOR AND ARRANGEMENTS THEREOF

[75] Inventor: Hai N. Nguyen, Greenfield Park, Canada

[73] Assignee: 118343 Canada Inc., Montreal, Canada

[21] Appl. No.: 442,242

[22] Filed: Nov. 17, 1982

[51] Int. Cl.³ ............................................... F24J 3/02
[52] U.S. Cl. ................................... 126/432; 126/442; 126/448
[58] Field of Search ............... 126/448, 450, 442, 432

[56] References Cited

U.S. PATENT DOCUMENTS

| | | | |
|---|---|---|---|
| 980,505 | 1/1911 | Emmet | 126/443 |
| 4,048,983 | 9/1977 | Pei | 126/442 X |
| 4,137,903 | 2/1979 | Annett | 126/443 |
| 4,304,222 | 12/1981 | Novinger | 126/443 |
| 4,319,561 | 3/1982 | Pei | 126/443 X |

Primary Examiner—Larry Jones
Attorney, Agent, or Firm—Alan Swabey; Robert Mitchell; Guy J. Houle

[57] ABSTRACT

In an all liquid flat plate type solar collector having risers therein, the risers having inlet and outlet portions, the improvement comprises providing a single header for servicing the risers and arranging the risers inlet and outlet portions within the header so as to obtain flow through the risers using the velocity effect or dynamic effect of flow through the header.

4 Claims, 11 Drawing Figures

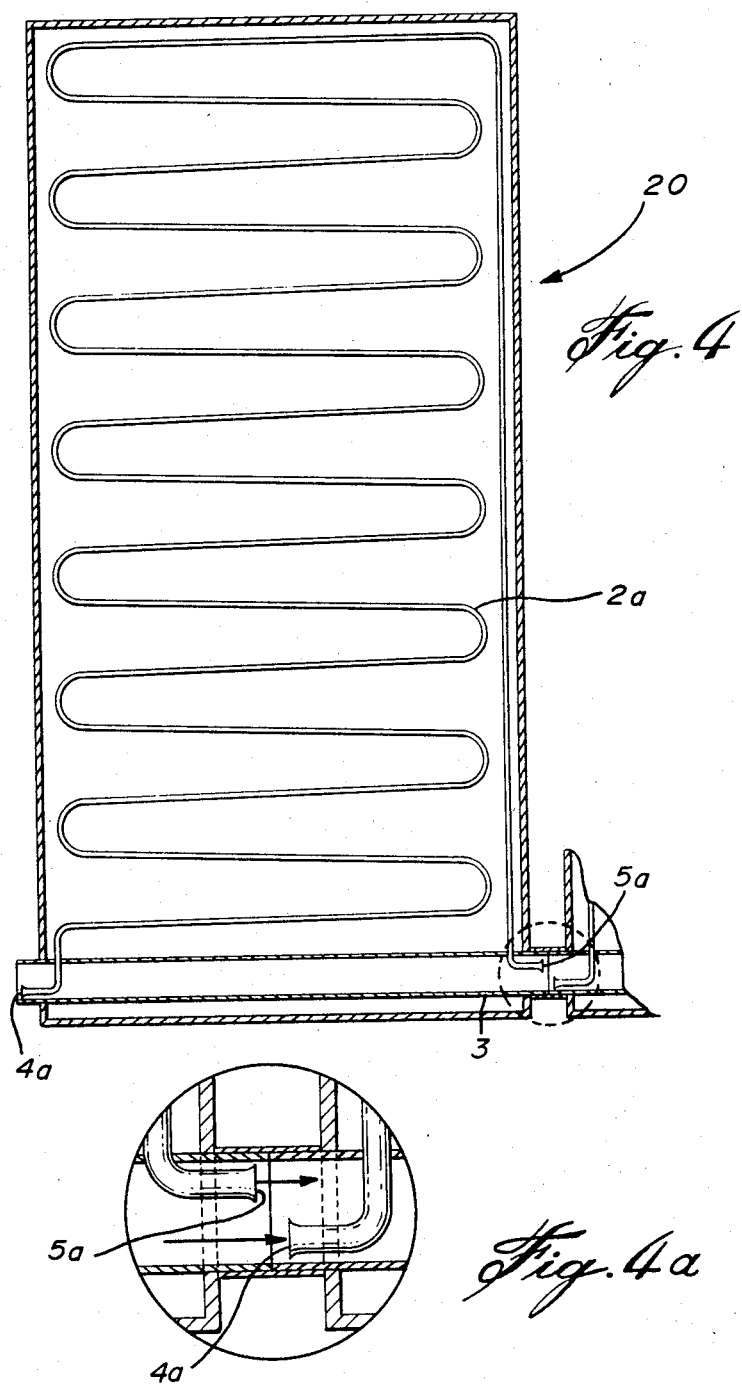

SOLAR COLLECTOR AND ARRANGEMENTS THEREOF

BACKGROUND OF INVENTION (a) Field of the Invention

The present invention relates to improvements in solar collectors, particularly of the liquid flat plate type. The present invention further relates to a novel arrangement of the collectors afforded by the present improvements. The present invention further relates to the novel method of system flushing and a further method associated with operation of the improved solar collector(s).

(b) Description of Prior Art

As is known, many solar collectors of the liquid flat plate type exist, however, due to their design, they suffer substantial drawbacks. Such drawbacks result particularly from the piping arrangements utilized within and without the collectors and the distribution thereof.

The solar apparatus industry has been striving for a number of years to overcome the problems associated with the known collector designs and arrangements thereof. For example, to come up with an improved solar collector and an improved arrangement of solar collectors. Particularly, collectors and arrangements having improved piping and distribution which would eliminate alot of piping, field work, insulation and the problem of reverse piping and balancing.

SUMMARY OF INVENTION

It is an important aim of the invention to provide an improved solar collector of the liquid flat plate type and an improved arrangement of such type collectors which overcome the aforementioned drawbacks.

It is a further important aim of the present invention to provide an arrangement of liquid flat plate type collectors wherein such is compact, affords a simple compact ganged arrangement of the collectors one to another and affords a simple piping arrangement for servicing the assembled collectors.

It is a further important aim of the present invention to provide a simple design of solar collector which will function on drain back system with water as well as on closed loop with fluid such as Aquasol 60 NT.

In one aspect of the present invention there is provided an all liquid flat plate type solar collector having risers therein, the risers having inlet and outlet portions, the improvement comprises providing a single header for servicing the risers and arranging the risers inlet and outlet portions within the header so as to obtain flow through the risers using the velocity effect or dynamic effect of flow through the header.

BRIEF DESCRIPTION OF DRAWINGS

The invention is illustrated by way of example in the accompanying drawings wherein:

FIG. 4 illustrates a further embodiment of solar collector in accordance with the present invention and features, as referred hereinafter, a THERMO-DYNA FLO header for thermo-syphon type solar collector;

FIG. 4a illustrates an enlarged view of a riser inlet and outlet portions arranged in accordance with the present invention.

DESCRIPTION OF PREFERRED EMBODIMENTS

Referring now in detail to the drawings.

Figure 1:
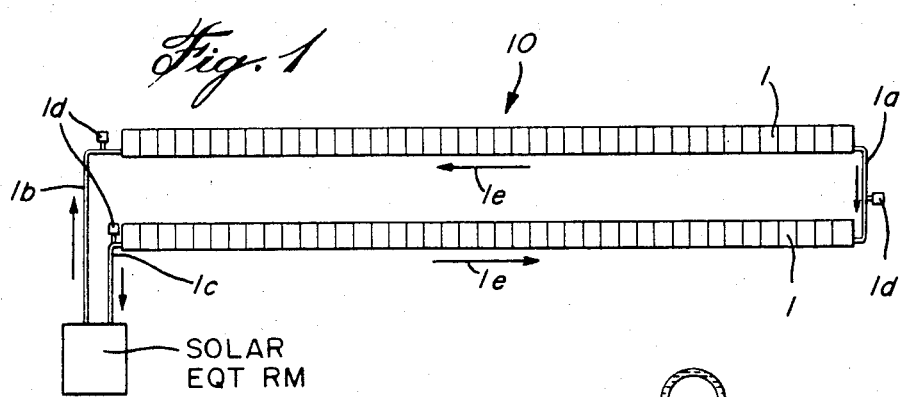
FIG. 1 illustrates an arrangement of flat plate type solar collectors in accordance with the present invention.
Figure 3:
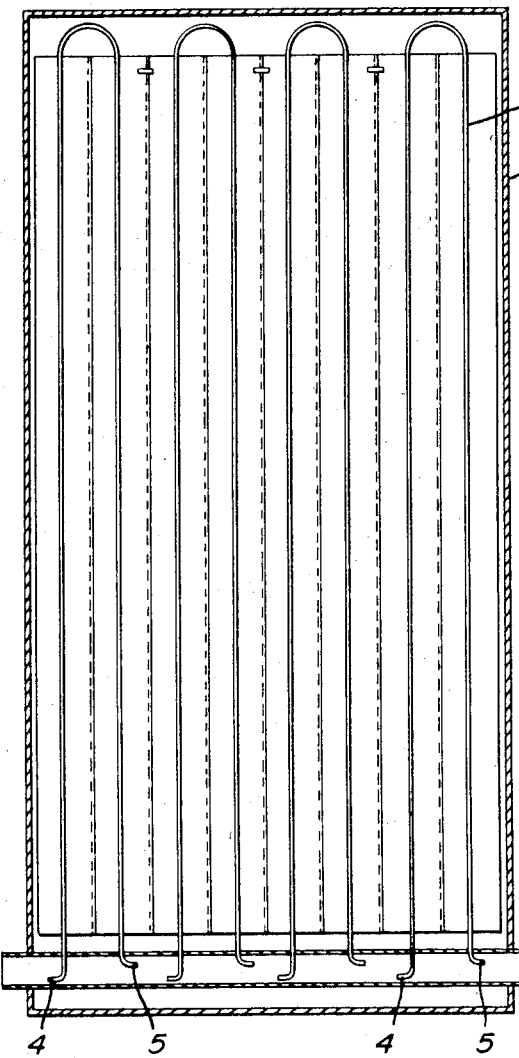
FIG. 3 illustrates a solar collector inaccordance with the present invention.
Figure 3B:
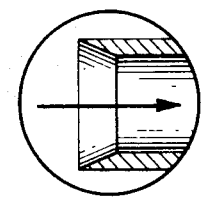
FIG. 3b illustrates an enlarged view of a riser inlet portion in accordance with the present invention.

FIG. 1 illustrates an arrangement 10 of flat plate type solar collectors arranged in end-to-end relation, collectors 1 having risers 2 therein, best seen in FIG. 3. Each of the collectors 1 includes a mono header 3 with inlet and outlet portions respectively 4 and 5, best seen in FIG. 3a which shows inlet 4 having an internal chamfer to provide a sharp end to increase flow effect. Header 3 thus provides a common header throughout the ganged collectors 1, being connected by a line 1a and by lines 1b and 1c to solar EQT RM. Lines 1b and 1c it will be noted include item 1d, i.e., an air vent for closed loop vacuum breaker for drain back. In the arrangement 10, up to 40 collectors may be arranged in end to end relation. The arrows i.e. shown centrally of FIG. 1, indicate slope direction.

Figure 2:
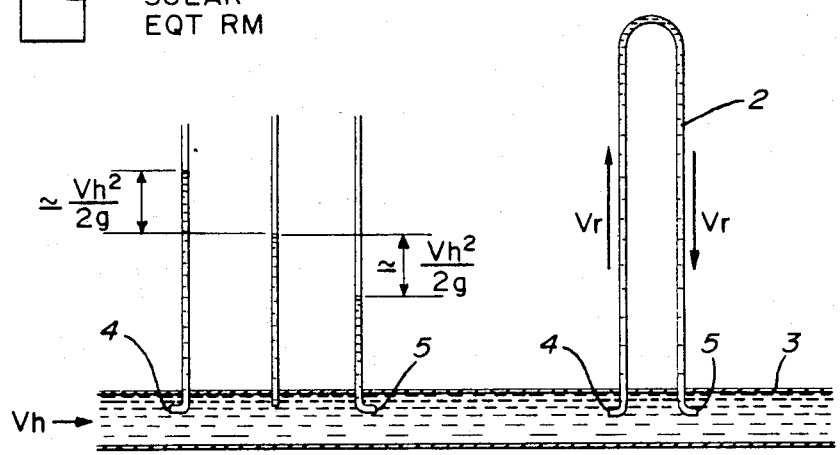
FIG. 2 illustrates diagrammatically the principle employed in the present invention.

Reference is now made to FIG. 2 illustrating diagrammatically the present DYNA FLO principle employed to obtain positive flow through the collector risers and which utilizes the velocity effect or dynamic effect of flow in the collector MONO header. Such will be more clearly understood with reference to the following:

$$\Delta h = k_1 \left( \frac{V_h^2 - V_r^2}{2g} \right) + k_2 \left( \frac{V_h^2 - V_r^2}{2g} \right) = (k_1 + k_2) \left( \frac{V_h^2 - V_r^2}{2g} \right)$$

DYNA FLO $L_e$ tot. = 20ft maximum, $k_1 = 0.70$, $k_2 = 0.90$ (assumptions)

THERMO-DYNA FLO $L_e$ tot. = 75ft maximum, $k_1 = 0.90$, $k_2 = 0.90$. (assumptions)

Flow through collector risers 2 is obtained using velocity effect or dynamic effect of flow in the MONO header collector 3. Consequently, if one has 80 collectors assembled as for example per FIG. 1 embodiment with 2″ MONO header 3 mounted in end-to-end relationship as seen in FIG. 1, the velocity of solar fluid in the header remains the same from inlet to outlet of collector bank and the flow through risers 2, which is created by the above velocity, becomes identical from one end to another providing a very simple flow distribution.

Referring now to FIG. 4, there is illustrated a further embodiment arrangement 20 according to the present invention, having again a simple MONO header 3 in which are disposed an inlet portion 4a on a first plane and outlet portion 5a on a second plane comprising respectively elbows, the inlet portion 4a facing to receive the flow within header 3 and the outlet portion 5a facing in an opposite direction away from the flow within header 3, clearly shown in enlarged view in FIG. 4a, which illustrates a flared end inlet tube for a thermosyphon type solar collector.

In the type of application illustrated in FIG. 4, besides the present DYNA-FLO principle, the thermal rising effect of fluid in riser helps to overcome friction in riser circuit while the drop in the return experiences no change in temperature and therefore no counter thermal effect is encountered. This results in a net gain of flow in the riser due to thermal effect of the collector. This thermal effect contributes to increased flow in the riser when sunshine is present.

Reference is now made to the following tabulations showing results obtained from expermintation together with conclusions.

DYNA FLO COLLECTOR HEADER WITH RISER ⅜″ TABULATION

| GPM-Header | | | | V Header | ΔP | ΔP | Flow | Max. T (°F.) |
|---|---|---|---|---|---|---|---|---|
| 1″ | 1¼″ | 1½″ | 2″ | fps | ft/cct | ft/100 ft | gpm/cct | solar-july-Montreal* |
| 5.5 | 8.1 | 11 | 18.5 | (2) | 0.099 | 0.497 | 0.30 | (9.2) |
| 11 | 16 | 22 | 38 | 4 | 0.397 | 1.980 | 0.60 | 4.6 |
| 16 | 25 | 32 | 56 | 6 | 0.894 | 4.470 | 0.90 | 3.0 |
| 21 | 32 | 43 | 76 | 8 | 1.589 | 7.950 | 1.20 | 2.3 |
| Not recommended ( ) | | | | (10) | 2.485 | 12.420 | 1.60 | (1.73) |

: Recommended due to limit on friction
*Based on 72% Efficiency, 240 BTU/hr. sq. ft. Insolation. One set of cct = ¼ coll. 4′ × 8′ = 8 sq. ft. = 1382.4 BTUH. Recommended gpm per coll. = 32 × 240 × 72%/(500 × 10° F.) = 1.1 gpm, say 1.0 gmp ≈ 10° F.
Conclusion:
1″ header can take 12 up to 15 gpm = collectors: 8 to 16
1¼″ header can take 16 up to 24 gpm = collectors: 17 to 24
1½″ header can take 25 up to 37 gpm = collectors: 25 to 36
2″ header can take 38 up to 76 gpm = collectors: 37 to 80
minimum flow = 12 gpm
maximum flow = 76 gpm

THERMO-DYNA FLO COLLECTOR HEADER WITH RISER ⅜″ TABULATION

| GMP-Header | | | | V Header | ΔP | ΔP | Flow | Max. T (°F.) |
|---|---|---|---|---|---|---|---|---|
| 1″ | 1¼″ | 1½″ | 2″ | fps | ft/cct | ft/100 ft | gpm/cct | solar-july-Montreal* |
| 5.5 | 8.1 | 11 | 18.5 | (2) | 0.111 | 0.148 | 0.16 | (69.12) |
| 11 | 16 | 22 | 38 | 4 | 0.447 | 0.595 | 0.32 | (34.56) |
| 16 | 25 | 32 | 56 | 6 | 1.005 | 1.341 | 0.48 | (23.00) |
| 21 | 32 | 43 | 76 | 8 | 1.788 | 2.380 | 0.65 | (17.00) |
| Not recommended ( ) | | | | (10) | 2.795 | 3.730 | 0.80 | (13.80) |

: Recommended due to limit on friction
*Based on 72% Efficiency, 240 BTU/hr. sq. ft. Insolation. Total collector area = 32 sq. ft. = 5529.6 BTUH. Recommended gpm per coll. = 32 × 240 × 72%/(500 × 10° F.) = 1.1 gpm, say 1.0 gpm ≈ 10° F.
Conclusion: It is not recommended to use ⅜″ riser on a Thermo-Dyna Flo collector.

THERMO-DYNA-FLO COLLECTOR HEADER WITH RISER ½″ TABULATION

| GPM-Header | | | | V Header | ΔP | ΔP | Flow | Max. T (°F.)* |
|---|---|---|---|---|---|---|---|---|
| 1″ | 1¼″ | 1½″ | 2″ | fps | ft/cct | ft/100 ft | gpm/cct | solar-july-Montreal |
| 5.5 | 8.1 | 11 | 18.5 | (2) | 0.111 | 0.148 | 0.28 | (39.50) |
| 11 | 16 | 22 | 38 | 4 | 0.447 | 0.595 | 0.56 | 19.75 |
| 16 | 25 | 32 | 56 | 6 | 1.005 | 1.341 | 0.84 | 13.20 |
| 21 | 32 | 43 | 76 | 8 | 1.788 | 2.380 | 1.15 | 9.60 |
| Not recommended ( ) | | | | (10) | 2.795 | 3.730 | 1.40 | (7.90) |

: Recommended due to limit on friction
*Based on 72% Efficiency, 240 BTU/hr. sq. ft. Insolation. Total collector area = 32 sq. ft. = 5529.6 BTUH. Recommended gpm per coll. = 32 × 240 × 72%/(500 × 10° F.) = 1.1 gpm, say 1.0 gpm ≈ 10° F.
Conclusion:
1″ header can take 12 up to 15 gpm = collectors 8 to 16
1¼″ header can take 16 up to 24 gpm = collectors 17 to 24
1½″ header can take 25 up to 37 gpm = collectors 25 to 36
2″ header can take 38 up to 76 gpm = collectors 37 to 80
minimum flow = 12 gpm
maximum flow = 76 gpm Turning now to the matter of application.

For a positive flow in a riser, it is recommended to operate a header at 4 fps or higher, but not to exceed 8 fps in any case.

Figure 3A:
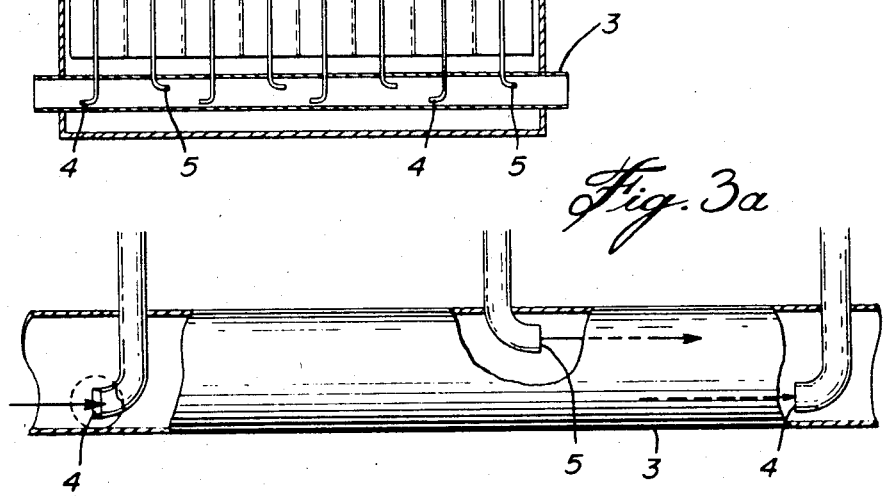
FIG. 3a illustrates a header in accordance with the present invention and referred to hereinafter as a DYNA-FLO header.

In the case of a closed loop system, DYNA-FLO header collectors, i.e. in accordance with FIG. 3a embodiment, may be used with a header at the high end or low end, a high end header permits risers to operate without an air pocket, but does not permit complete draining of a collector when the latter has to be removed for servicing. However, this type of servicing is very seldom required, so that there is virtually no inconvenience caused. A low end header permits free draining of the system but high points of risers may trap air mainly and mostly during the start-up period. This could be overcome by providing the system with some means to move the air out; however, this is really not necessary and preferably avoided. For reason of simplicity, a closed loop system shall be installed with DYNA-FLO header at the high end. A THERMO-DYNA FLO header is also applicable to a close loop system, in similar fashion as DYNA-FLO header.

In the case of an open loop drain back system, it is obvious that in drain back systems, DYNA-FLO headers and THERMO DYNA-FLO headers shall be installed at low end of collector. In this position, collector risers will trap air at high points, mainly during system starting and sometimes during system operation, so that it is necessary that the system be flushed to remove air at starting and from time to time during operation, as soon as there is sign of presence of air at high points of the risers. Applicant is introducing here a new concept in open loop drain back system referred hereinafter as air flushing cycle, details of which will become apparent from the following.

Figure 5:
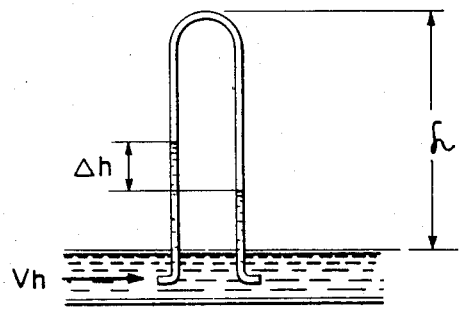
FIGS. 5, 6, 7 and 8 are diagrams aiding explanation of the aforementioned novel method of system flushing.

Referring to FIG. 5, in normal limits of operation, $\Delta H$ varies between 0.4 ft. and 1.8 ft. so that during the starting period of drain back system header is gradually filled with water; following which air gets trapped in riser when the header is full. In order to remove the air during the starting period, or any time during the operating period, it is essential that $\Delta h > h$. This means that velocity in the header should be increased in order to move the air out of the top of the risers. One may ask to what extent a $4' \times 8'$ collector installed at 45° tilt will produce = $7.75/\sqrt{2} = 5.48$ ft. During the air flushing cycle, there should be $\Delta h > h$. From the previous basic formula, $\Delta h$(flushing) exceeds 6 ft. H$_2$O when $V_h$ (flushing) approaches 16 fps. This means that system flow shall be increased up to 3 to 4 times on a collector bank of up to 48 collectors and 2 to 3 times on a collector bank of 50 to 80 collectors. This may be achieved by using, for example, a multi-speed motor or variable speed coupling on the solar pump associated with the collectors. The HP required during air flushing cycle may be relatively high but the flushing time would not normally last more than 1 to 2 minutes at the most, depending on the system size. Implementation of the air flushing cycle may be realized as follows.

Figure 6:
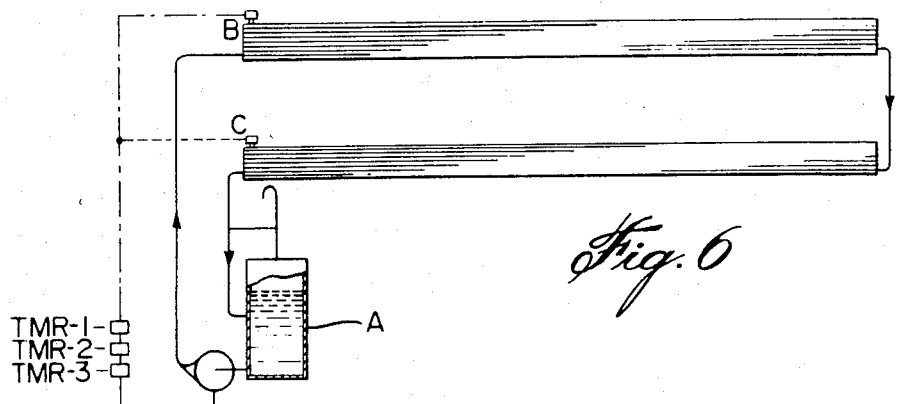

Referring to FIG. 6, solar pump A starts normally—after say 5 minutes (timer TMR-1) air detection circuit is energized; if air is detected at high point of 1st and last collector risers, timer TMR-3 will set pump on high flow for the air flushing cycle for about approximately 2 minutes. Air detection may be made by a low voltage electrode type inserted at high points of collector riser designated respectively B and C.

Figure 7:
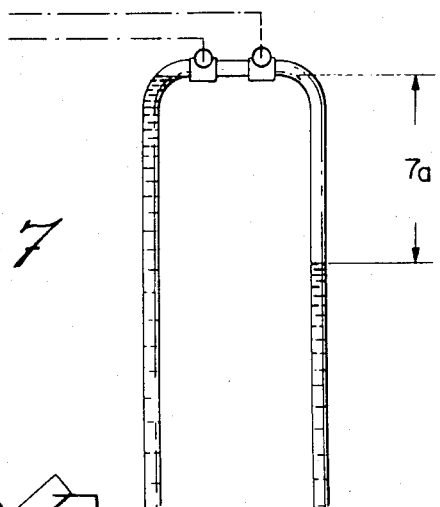

Referring to FIG. 7, this circuit is energized only after the system has started for 5 minutes. (TMR-1) "No-Flow" signal is transmitted to the controller for air flushing cycle only when this signal lasts over 1 minute (TMR-2). The flushing cycle lasts for 2 minutes (TMR-3). The worst condition of no flow is indicated at 7a in FIG. 7.

Figure 8:
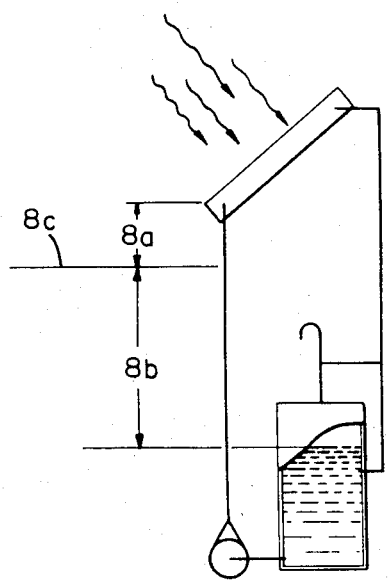

Referring to FIG. 8, showing a typical example installation, with reference to normal and air flushing operation. In FIG. 8, dimension 8a measures 4.5 feet and dimension 8b measures 12 feet. 8c designates roof line. Associated therewith 60 collectors=250 feet, 2 inches diameter 60 gpm=6.5 ft/100.($\geq$6 f.p.s.). Supply=70 feet; return=50 feet and lift=16.5 feet.

Normal Operation:
Supply:      4.55'
Collectors:  21.12 (see detailed calc. next sheet)
Lift:        16.5'
Return:      (gravity return not accounted for pumping)
Total head:  42.17 ft.

Pump BHP = $\frac{60 \times 42.17}{3960 \times .6}$ = 1.06 BHP

Air Flushing Operation:

16 fps required − $F_p = \left(\frac{16}{6}\right)^2 = 7$

Supply:      31.85
Collectors:  147.84
Lift:        16.5'
Return:      22.75' − 16.5 = 6.25
Total head:  202.44

Pump BHP = $\frac{60 \times 202.44}{3960 \times .6}$ = 4.11 BHP

A 120 collector system similar to the above would be piped in 2 parallel rows of 60 collectors each; such would require approximately 2 BHP for normal operation and 10 BHP for air flushing cycle.

Turning to the matter of pressure drop. Theoretically, the pressure drop in a collector bank is composed of 2 parts:

(1) normal friction in the header, increased by roughly 10% to compensate for certain obstruction in the header; and
(2) Dynamic effect of flow in risers.

Taking for example 60 collectors with 2" DYNA-FLO header @ 60 gpm. Collector header P.D.=250×6.5/100=16.25 (1), with 10% increase due to obstructions=1.63 (2) 0.9 gpm/set of risers at $\Delta h$=0.9 ft. Total qty. of movement: 0.9 gpm/set of risers×240 sets of risers @ 0.9 ft. $\Delta h$=194.4, compared to 60 gpm=194.4/60=3.24 ft. (3) (conservation of qty. of movement MV=constant). Total collector bank PD=21.12 ft. [(1)+(2)=(3)] or: 21.12−16.25=4.87 ft. due to DYNA-FLO effect. This amounts to: 4.87/60=0.08 ft. @ 60 gpm per collector which is deemed quite reasonable.

It will be appreciated certain assumptions used in the aforementioned calculations may not correspond perfectly to the true values of collector headers which may be selected, which may therefore vary with header and riser size, metal used, physical assembly, etc.

The following aids to illustrate the benefits derived from the present invention, taking for example one multi-riser type of liquid flat plate collector currently in use. The normal flow through the riser tube varies between 0.125 USgpm to 0.188 USgpm. Calculations show that with the collector header in accordance with the present invention, the riser flow may vary between 0.60 to 1.20 USgpm per set of riser, or 0.30 USgpm to 0.60 USgpm per riser. This means that the same present collector mounted on the header in accordance with the present invention will be more effective and also that the actual application of this concept is not really affected by the slight difference between actual and predicted riser flow values. The phenomena commonly identified as "vena contracta" may be revealed by lab tests to be more or less pronounced than what is assumed in the present calculations; but this may also be proved to be virtually eliminated by the "sharp edge" and/or "bell-mouth" effect of the riser inlet tube. It is appreciated there may be some slight adjustment needed to the disclosed design to accommodate fabrication, for instance, the 90° bend at riser outlet tube may not be required on a closed loop type collector.

From the foregoing, it will be evident, a number of major problems have been eliminated as a result of the present invention.

I claim:

1. In a solar collector having fluid conveying means, in an energy absorbing area thereof, said means having fluid inlet and outlet means communicating with a further fluid conveying means for use in supplying fluid to said conveying menas in said area, said further fluid conveying means comprising a tubular member having a bore extending therethrough, including intermediate points of communication of said inlet and outlet means with said further fluid conveying means, said fluid conveying means in the energy absorbing area comprising a tubular member whose bore is smaller than that of said further fluid conveying means, said inlet and outlet means each comprising a mouth, at least one of which depends within said further fluid conveying means and is orientated such that it faces in a direction away from the other of said mouths, said direction being generally in common with that of the longitudinal axis passing through said further fluid conveying means, whereby fluid flowing through said fluid conveying means in said area uses the velocity effect of said fluid flowing through said further fluid conveying means.

2. A solar collector as defined in claim 1, wherein both of said mouths depend within said further fluid conveying means, the respective mouths being orientated such that they face away from each other in opposite directions.

3. A solar collector as defined in claim 2, wherein, in working position, said respective inlet and outlet mouths are positioned within said further fluid conveying means at different elevations, one to another.

4. A solar collector as defined in claim 2, wherein, in working position, said respective inlet and outlet mouths are positioned within said further fluid conveying means at a common elevation.

* * * * *